US008472039B2

(12) United States Patent
Lee

(10) Patent No.: US 8,472,039 B2
(45) Date of Patent: Jun. 25, 2013

(54) COPY APPARATUS HAVING A COPY PREVENTION FUNCTION AND A COPY PREVENTION METHOD THEREOF

(75) Inventor: Choon-hong Lee, Suwon-si (KR)

(73) Assignee: SAMSUNG Electronics Co., Ltd., Suwon-si (KR)

(*) Notice: Subject to any disclaimer, the term of this patent is extended or adjusted under 35 U.S.C. 154(b) by 1008 days.

(21) Appl. No.: 11/970,663

(22) Filed: Jan. 8, 2008

(65) Prior Publication Data

US 2009/0015873 A1 Jan. 15, 2009

(30) Foreign Application Priority Data

Jul. 10, 2007 (KR) ........................ 10-2007-0069361

(51) Int. Cl.
*G06K 15/00* (2006.01)

(52) U.S. Cl.
USPC ......... 358/1.14; 358/1.9; 358/3.28; 358/1.18; 382/181; 382/209; 382/216

(58) Field of Classification Search
USPC .................................................. 382/181–231
See application file for complete search history.

(56) References Cited

U.S. PATENT DOCUMENTS

| | | | | |
|---|---|---|---|---|
| 5,321,470 | A * | 6/1994 | Hasuo et al. | 399/366 |
| 5,631,723 | A * | 5/1997 | Arimoto et al. | 399/366 |
| 5,647,010 | A * | 7/1997 | Okubo et al. | 382/100 |
| 5,892,837 | A * | 4/1999 | Luo et al. | 382/117 |
| 6,604,682 | B2 * | 8/2003 | Wakamiya et al. | 235/462.01 |
| 6,792,128 | B1 * | 9/2004 | Nguyen | 382/100 |
| 7,050,653 | B2 * | 5/2006 | Edso et al. | 382/280 |
| 7,200,270 | B2 * | 4/2007 | Yamaguchi | 382/224 |
| 7,706,026 | B2 * | 4/2010 | Ishii | 358/3.28 |
| 2001/0017709 | A1 * | 8/2001 | Murakami et al. | 358/1.14 |
| 2001/0031079 | A1 * | 10/2001 | Ryder | 382/141 |
| 2005/0151989 | A1 | 7/2005 | Shimura et al. | |

FOREIGN PATENT DOCUMENTS

| | | |
|---|---|---|
| CN | 1334544 | 2/2002 |
| CN | 1684490 | 10/2005 |
| JP | 2002-190952 | 7/2002 |
| JP | 2004-282633 | 10/2004 |
| JP | 2005-160016 | 6/2005 |

OTHER PUBLICATIONS

Chinese Office Action Issued Mar. 6, 2012 in CN Patent Application No. 200810095968.1.

* cited by examiner

*Primary Examiner* — Richard Zhu
(74) *Attorney, Agent, or Firm* — Stanzione & Kim, LLP

(57) ABSTRACT

A copy apparatus having a copy prevention function. The copy apparatus includes a scan unit to scan an image, a pattern detection unit to detect patterns corresponding to pre-stored copy prevention patterns from among patterns in the scanned image, and a control unit to prevent the image from being printed if a ratio of the detected patterns is identical to a ratio of the copy prevention patterns. Accordingly, even though money which has been enlarged or reduced in size is copied, the money is not copied due to the location ratio of the patterns in the image.

22 Claims, 8 Drawing Sheets

COPY APPARATUS HAVING A COPY PREVENTION FUNCTION AND A COPY PREVENTION METHOD THEREOF

CROSS-REFERENCE TO RELATED APPLICATIONS

This application claims priority under 35 U.S.C. §119(a) from Korean Patent Application No. 10-2007-0069361, filed on Jul. 10, 2007, in the Korean Intellectual Property Office, the disclosure of which is incorporated herein by reference in its entirety.

BACKGROUND OF THE INVENTION

1. Field of the Invention

The present general inventive concept relates to a copy apparatus having a copy prevention function and a copy prevention method thereof. More particularly, the present general inventive concept relates to a copy apparatus which performs a printing operation by comparing a ratio of patterns in an image with a ratio of pre-stored copy prevention patterns, and a copy prevention method thereof.

2. Description of the Related Art

In general, copy apparatuses, such as scanners, copiers, and multifunction apparatuses, print images on paper. The use of copy apparatuses is widespread in home as well as offices. Therefore, copy apparatuses providing more advanced printing quality have been developed. However, this also has the effect of enabling misuse of the copy apparatuses in order to counterfeit money.

A conventional method for preventing counterfeit notes is that copy apparatuses store patterns of the money, and do not print an image if the image corresponds to one of the patterns of money. However, such copy apparatuses cannot prevent copying if enlarged size of money is copied to be reduced or reduced size of money is copied to be enlarged. A solution for this problem is required, as the circulation of counterfeit notes is a social issue in any countries.

SUMMARY OF THE INVENTION

The present general inventive concept provides a copy apparatus which compares a ratio of patterns in an image with a ratio of pre-stored copy prevention patterns and prevents a printing operation if the ratios are identical so that copying of a transformed size of money is prevented, and a copy prevention method thereof.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a copy apparatus including a scan unit to scan an image, a pattern detection unit to detect patterns corresponding to pre-stored copy prevention patterns from among patterns in the scanned image, and a control unit to prevent the image from being printed if a ratio of the detected patterns is identical to a ratio of the copy prevention patterns.

The pattern detection unit includes a binarization unit to binarize the scanned image, and a detection unit to detect an image section including the patterns presumed to be the copy prevention patterns from among the binarized image.

The control unit calculates the ratio of the detected patterns using distances between the detected patterns, and determines if the calculated ratio is identical to the ratio of the copy prevention pattern.

The pattern detection unit detects patterns using the shape of the patterns in the image if a brightness reverse copy signal is input.

The ratio is a location ratio between the patterns, which is at least one of a horizontal distance ratio, a vertical distance ratio, a diagonal distance ratio, an entire distance ratio, and an angle ratio between the patterns.

The foregoing and/or other aspects and utilities of the present general inventive concept may also be achieved by providing a copy prevention method, the method including scanning an image, detecting patterns corresponding to pre-stored copy prevention patterns from among patterns in the scanned image, and preventing the image from being printed if a ratio of the detected patterns is identical to a ratio of the copy prevention patterns.

Preventing the image from being printed includes binarizing the scanned image, and detecting an image section including the patterns presumed to be the copy prevention patterns from among the binarized image.

In preventing the image from being printed, the ratio of the detected patterns is calculated using distances between the detected patterns, and it is determined if the calculated ratio is identical to the ratio of the copy prevention pattern.

In preventing the image from being printed, patterns are detected using the shape of the patterns in the image if a brightness reverse copy signal is input.

The ratio is a location ratio between the patterns, which is at least one of a horizontal distance ratio, a vertical distance ratio, a diagonal distance ratio, an entire distance ratio, and an angle ratio between the patterns.

The foregoing and/or other aspects and utilities of the present general inventive concept may also be achieved by providing a copy apparatus including a scan unit which scans an image, and a pattern detection unit to detect patterns corresponding to a ratio of pre-stored copy prevention patterns from among patterns in the scanned image.

The copy apparatus further includes a control unit to prevent the image from being printed if the pattern detection unit detects the patterns corresponding to the ratio of pre-stored copy prevention patterns.

The foregoing and/or other aspects and utilities of the present general inventive concept may also be achieved by providing a copy apparatus comprising a scan unit which scans an image, and a control unit to prevent the image from being printed if patterns corresponding to a ratio of pre-stored copy prevention patterns are included in the scanned image.

The control unit detects the patterns corresponding to the ratio of the copy prevention patterns using the shape of the patterns in the image if a brightness reverse copy signal is input, so that the image is not printed.

The foregoing and/or other aspects and utilities of the present general inventive concept may also be achieved by providing a copy apparatus including a pattern detection unit to detect patterns corresponding to pre-stored copy prevention patterns from among patterns of a scanned image, and a control unit to prevent the image from being printed if a ratio of the detected patterns is identical to a ratio of the copy prevention patterns.

The copy apparatus may further include a scan unit to scan an image to generate the scanned image.

The scan unit may be connected to the pattern detection unit through a wire network or a wireless network.

The copy apparatus may further include a scan unit to scan a first image and reduces or enlarges the first image to generate a second image as the scanned image.

The copy apparatus may further include a print unit to print the scanned image, and the control unit may not transmit the scanned image to the print unit to prevent the scanned image from being printed.

The copy apparatus may further include a storage unit to store the scanned image, and the control unit may control the storage unit not to store the scanned image.

The copy apparatus may further include an external device connected to the control unit to exchange or receive data with or from the control unit, and the control unit may not transmit the scanned image to the external device.

The patterns may include a first group of patterns having a first characteristic, and a second group of patterns having a second characteristic, the pre-stored copy prevention patterns may include a third group of patterns having a third characteristic, and a fourth group of patterns having a fourth characteristic, the ratio of the patterns may be a ratio of the first characteristic and the second characteristic, and the ratio of the copy prevention patterns may be a ratio of the third characteristic and the fourth characteristic.

The patterns may include a first group of patterns spaced-apart from each other by a first distance, and a second group of patterns spaced-apart from each other by a second distance, the pre-stored copy prevention patterns may include a third group of patterns spaced-apart from each other by a third distance, and a fourth group of patterns spaced-apart from each other by a fourth distance; the ratio of the patterns may include a ratio of the first distance and the second distance, and the ratio of the copy prevention patterns may include a ratio of the third distance and the fourth distance.

The first distance, the second distance, the third distance, and the fourth distance may be disposed in a same direction.

The patterns may include a combination of one or more of a picture pattern, a figure pattern, a numerical digit pattern, a letter patterns, and a watermark pattern.

BRIEF DESCRIPTION OF THE DRAWINGS

These and/or other aspects and utilities of the present general inventive concept will become apparent and more readily appreciated from the following description of the embodiments, taken in conjunction with the accompanying drawings, of which.

DETAILED DESCRIPTION OF THE PREFERRED EMBODIMENTS

Figure 1:
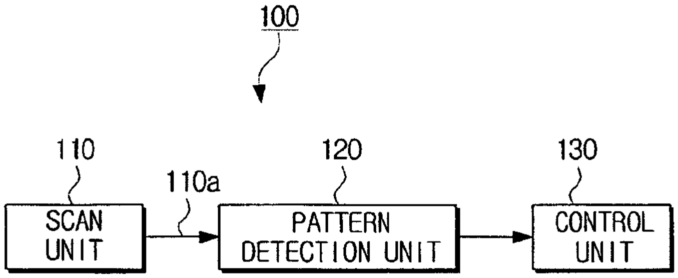
FIG. 1 is a block diagram illustrating a copy apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating a copy apparatus 100 according to an embodiment of the present general inventive concept. In FIG. 1, the copy apparatus 100 includes a scan unit 110, a pattern detection unit 120, and a control unit 130. The copy apparatus 100 may be an image forming apparatus with or without a scanning function. The image forming apparatus may be a color printing apparatus to form or print a color image on a printing image.

The scan unit 110 scans one of different types of money to generate a money image as a scanned image. The scan unit 110 is connected to the pattern detection unit 120 through a communication line 110*a*. When the scan unit 110 is disposed in the copy apparatus 100, the communication line 110*a* may be a signal line or data line. When the scan unit 110 is disposed in an external apparatus, the scan unit 110 can be connected to the pattern detection unit 120 through a wire network, a wireless network, etc., so that the scan unit 110 transmits the scanned image to the pattern detection unit 120. An Internet connection can be used as the communication line 110*a*.

The pattern detection unit 120 receives the scanned image from the scan unit 110 and detects patterns in the scanned image corresponding to reference patterns, for example, pre-stored copy prevention patterns. The copy prevention patterns are patterns to prevent money from being printed, and may include picture patterns, figure patterns, numerical digit patterns, letter patterns, etc. The present general inventive concept is not limited thereto. When watermarks are disposed in the scanned image, the watermarks can be used as the patterns. The patterns may be one or more combinations of the picture pattern, the figure pattern, the numerical digit pattern, the letter patterns, the watermark pattern, and so on.

If the patterns are detected by the pattern detection unit 120, the control unit 130 compares at least one ratio of the detected patterns with at least one ratio of the pre-stored copy prevention patterns, which may be a location ratio of patterns included in genuine currency (money). The location ratio may include a ratio of distances, angles, or characteristics between the patterns or between each pattern and a reference pattern or a reference location.

If the location ratio of the detected patterns is identical to that of the pre-stored copy prevention patterns, the control unit 130 recognizes that the image is money, and so the image is not printed. Accordingly, even when the size of the money is transformed, printing is prevented.

FIG. 1 illustrates the pattern detection unit 120 and the control unit 130 separately, but functions of the pattern detection unit 120 may be included in the control unit 130, and vice versa, so that functions of the pattern detection unit 120 and the control unit 130 can be implemented in a single element. That is, the pattern detection unit 120 or the control unit 130 can detect patterns of the scanned image corresponding to the pre-stored copy prevention patterns, and control the printing operation.

Figure 2:
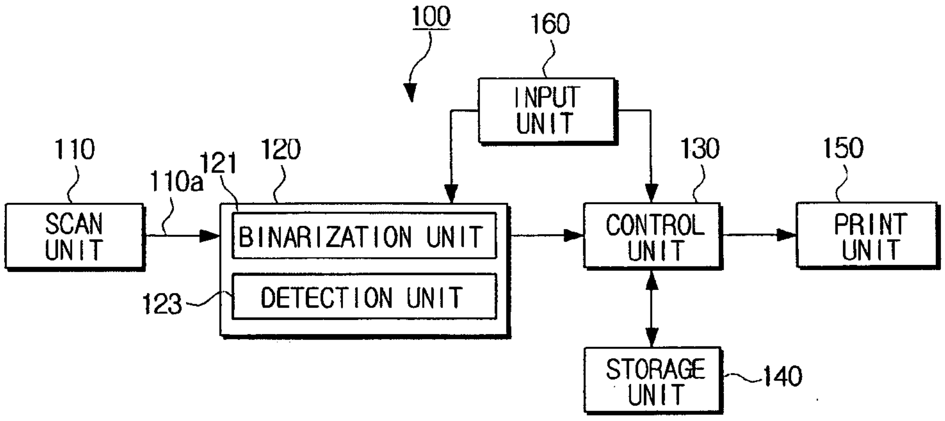
FIG. 2 is a block diagram illustrating the copy apparatus of FIG. 1.

FIG. 2 is a block diagram illustrating in more detail the configuration of the copy apparatus of FIG. 1. Referring to FIGS. 1 and 2, the copy apparatus 100 includes the scan unit 110, the pattern detection unit 120, a storage unit 140, a print unit 150, and the control unit 130.

The scan unit 110 scans images.

The pattern detection unit 120 comprises a binarization unit 121 and a detection unit 123. The binarization unit 121 binarizes pixels of the scanned image. More specifically, the binarization unit 121 identifies values of the pixels which constitute the image, and binarizes the pixel values based on a threshold value.

The detection unit 123 compares the binarized pixel values, detects relationships between adjacent pixels, and detects patterns by analyzing edges of the pixels according to the detected relationships. If it is presumed that the detected patterns are similar to the copy prevention patterns stored in the storage unit 140, an image section including the detected patterns is detected. For example, when the copy prevention patterns stored in the storage unit 140 include a pattern with a plurality of circles, if patterns detected from an image include a plurality of circles, the detected patterns are treated as the copy prevention patterns, and an image section is detected.

If a brightness reverse copy signal is input through an input unit 160, the detection unit 123 detects the relationships between the binarized pixels and detects shapes of the patterns. Accordingly, even when a brightness-reversed image is printed, the patterns corresponding to the copy prevention patterns can be detected using the same method as the method in which patterns of a brightness-not-reversed image are detected.

The storage unit 140 stores the copy prevention patterns and a location ratio of the copy prevention patterns, which comprises a horizontal ratio, a vertical ratio, an entire ratio, and a diagonal ratio, and an angle ratio between the copy prevention patterns or between at least one of the copy prevention patterns and a reference position.

The print unit 150 performs the printing operation.

If the pattern detection unit 120 detects patterns, the control unit 130 identifies the location of the patterns, and calculates a location ratio of the patterns. That is, the control unit 130 calculates a horizontal ratio, a vertical ratio, an entire ratio, and a diagonal ratio, and an angle ratio using distances between the patterns. Subsequently, the control unit 130 compares the location ratio of the patterns in the image with the location ratio of the stored copy prevention patterns. If the location ratio of the patterns in the image is identical to the location ratio of the stored copy prevention patterns, the control unit 130 prevents the print unit 150 from performing the printing operation. As a result, even though an image is an enlarged or reduced copy of money, the image is not printed due to the location ratio of the patterns in the image.

The control unit 130 operates the print unit 150 to print an image if the pattern detection unit 120 does not detect patterns corresponding to the copy prevention patterns or if the location ratio of the patterns in the image is not identical to that of the copy prevention patterns.

It is possible that the control unit 130 is connected to a second storage unit to store data generated from the pattern detection unit 120 or the control unit 130. In this case, the control unit can determine that the scanned image is not stored in the second storage unit when the scanned image is a money image. The storage unit 140 may be used as the second storage unit. When the control unit 130 is connected to an external device through a communication line, the control unit 130 prevents the scanned image from being transmitted to the external device.

Figure 3A:
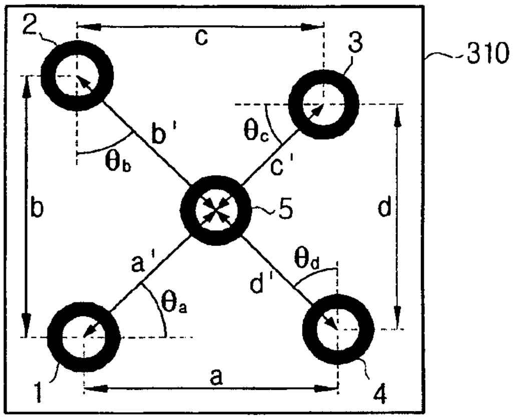
FIGS. 3A and 3E are views illustrating location ratios of patterns according to embodiments of the present general inventive concept.
Figure 3B:
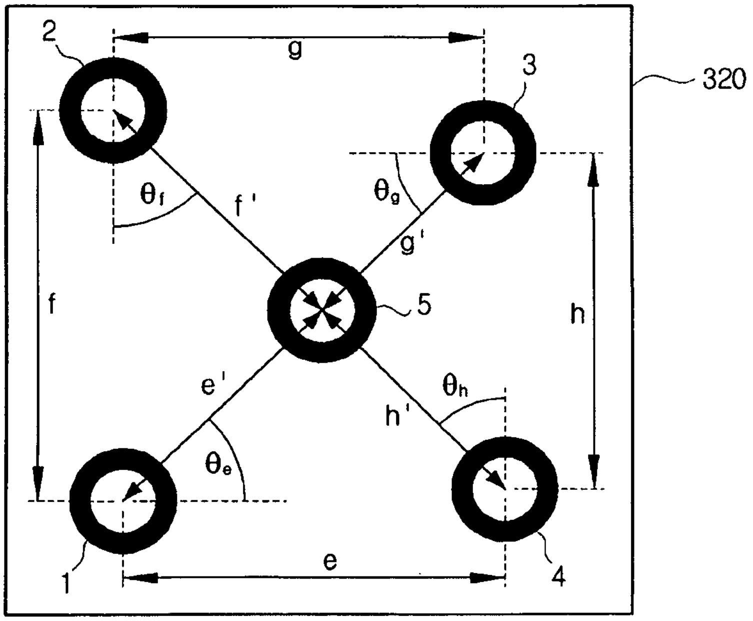
FIG. 3F illustrates a brightness-reserved image section.
Figure 3C:
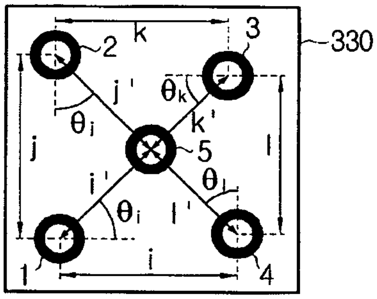
Figure 3D:
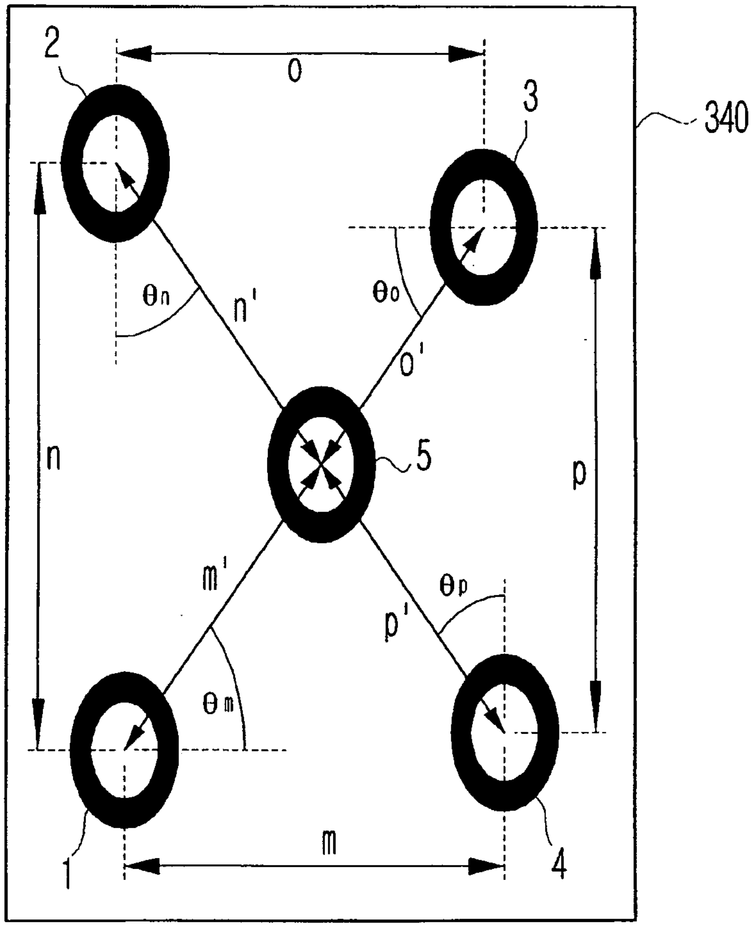
Figure 3E:
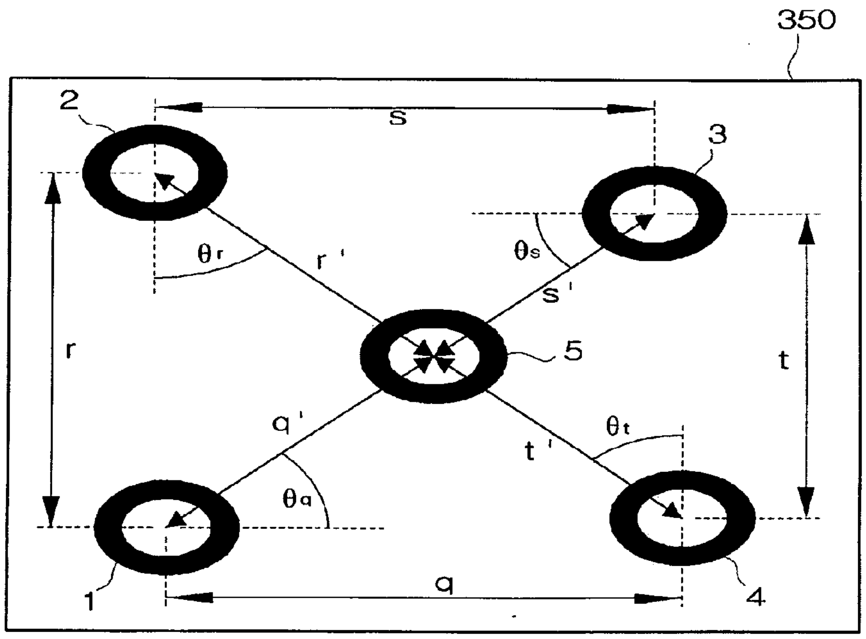

FIGS. 3A and 3E are views illustrating location ratios of patterns according to embodiments of the present general inventive concept. FIG. 3A illustrates copy prevention patterns stored in the storage unit 130 and location ratios of the copy prevention patterns.

The copy prevention patterns 310 illustrated in FIG. 3A may be picture patterns, figure patterns, or letter patterns, and functions as a reference for comparison. The copy apparatus 100 stores information regarding vertical distances, horizontal distances, diagonal distances, and angles between a plurality of patterns 1, 2, 3, 4, and 5 which constitute the copy prevention patterns 310, and also stores location ratios of the copy prevention patterns 310 using them.

The horizontal distances between the patterns are indicated as a and c, the vertical distances between the patterns as b and d, the diagonal distances between the patterns as a', b', c', and d', and the angles between the patterns as $\theta_a$, $\theta_b$, $\theta_c$, and $\theta_d$. Accordingly, the location ratios of the copy prevention patterns 310 include a horizontal ratio of a:c, a vertical ratio of b:d, an entire distance ratio of a:b:c:d, a diagonal ratio of a':b':c':d', and an angle ratio of $\theta_a:\theta_b:\theta_c:\theta_d$.

FIG. 3B illustrates patterns in an enlarged image and the location ratios of the patterns. A first image section 320 of FIG. 3B includes patterns detected by the pattern detection unit 120. The copy apparatus 100 calculates vertical distances, horizontal distances, diagonal distances, and angles between patterns 1, 2, 3, 4, and 5 in the first image section 320, and also calculates location ratios of the patterns 1, 2, 3, 4, and 5 using them.

More specifically, in the first image section of FIG. 3B, horizontal distances e and g, vertical distances f and h, diagonal distances e', f', g', and h', and angles $\theta_e$, $\theta_f$, $\theta_g$, and $\theta_h$ between patterns 1 to 5 are calculated. Subsequently, location ratios of the patterns 1 to 5 are calculated using them. Accordingly, the location ratios of the patterns 1 to 5 in the first image section 320 comprise an entire distance ratio of e:f:g:h, a diagonal ratio of e':f':g':h', and an angle ratio of $\theta_e:\theta_f:\theta_g:\theta_h$.

If the location ratios of the patterns 1 to 5 in the first image section 320 are calculated, the copy apparatus 100 determines if the location ratios of the patterns 1, 2, 3, 4, and 5 in the first image section 320 are identical to the location ratios of the copy prevention patterns 310 in FIG. 3A. That is, if the entire ratios a:b:c:d and e:f:g:h are identical, or if the diagonal ratios a':b':c':d' and e':f':g':h' are identical, the image including the first image section 320 is determined to be money. In addition, if the angle ratios of $\theta_a:\theta_b:\theta_c:\theta_d$ and $\theta_e:\theta_f:\theta_g:\theta_h$ are identical, the image including the first image section 320 is determined to be money.

For example, if it is assumed that a, b, c, and d in the copy prevention patterns 310 of FIG. 3A are 4, 3, 4, and 5, the entire ratio between the patterns is 4:3:4:5. If it is assumed that e, f, g, and h in the first image section 320 of FIG. 3B are 8, 6, 8, and 10, the entire ratio between the patterns is 8:6:8:10, that is, 4:3:4:5. Therefore, the location ratio of the copy prevention patterns 310, which is a reference, is identical to the location ratio of the patterns in the first image section 320, so the image including the first image section 320 is determined to be money. As a result, the image is not printed. Thus, although money which has been enlarged is copied in order to be reduced, printing is not performed if the location ratio of the patterns in the first image section 320 is identical to the location ratio of the copy prevention patterns of genuine money.

FIG. 3C illustrates patterns in a reduced image and location ratios of the patterns. A second image section 330 in FIG. 3C includes patterns detected by the pattern detection unit 120.

The copy apparatus 100 calculates distances i, j, k, and l, diagonal distances i', j', k' and l', and angles $\theta_i$, $\theta_j$, $\theta_k$, and $\theta_l$ between patterns 1, 2, 3, 4, and 5 in the second image section 330, and also calculates location ratios of the patterns 1, 2, 3, 4, and 5 using them, that is, i:j:k:l, a diagonal ratio of i':j':k':l', and an angle ratio of $\theta_i:\theta_j:\theta_k:\theta_l$.

If the location ratios of the patterns 1, 2, 3, 4, and 5 in the second image section 330 are calculated, the copy apparatus 100 determines if the location ratios of the patterns 1, 2, 3, 4, and 5 in the second image section 330 are identical to the location ratios of the copy prevention patterns 310 in FIG. 3A. For example, if it is assumed that a, b, c, and d in the copy prevention patterns 310 of FIG. 3A are 4, 3, 4, and 5, the entire ratio between the patterns is 4:3:4:5. If it is assumed that i, j, k, and l in the second image section 330 of FIG. 3C have values of 2, 1.5, 2, and 2.5, respectively, the entire ratio between the patterns is 4:3:4:5. Therefore, the location ratio of the copy prevention patterns 310, which is a reference, is identical to the location ratio of the patterns 1, 2, 3, 4, and 5 in the second image section 330, so the image is not printed. Thus, although money which has been reduced in size is copied so as to be enlarged, an image is determined to be money and printing is not performed if a location ratio of patterns in the image is identical to a location ratio of copy prevention patterns of genuine money. Consequently, counterfeit notes can be prevented.

FIG. 3D illustrates patterns in a vertically extended image and location ratios of the patterns. A third image section 340 in FIG. 3D includes patterns detected by the pattern detection unit 120.

The copy apparatus 100 calculates distances m, n, o, and p, diagonal distances m', n', o' and p', and angles $\theta_m$, $\theta_n$, $\theta_o$, and $\theta_p$ between patterns 1, 2, 3, 4, and 5 in the third image section 340.

In this embodiment, the copy apparatus 100 may determine whether to print the image using at least one of a horizontal distance ratio or a vertical distance ratio between the patterns. For example, if a vertical distance ratio of b:d or a horizontal distance ratio of a:c in the copy prevention patterns 310 of FIG. 3A is identical to that of n:p or that of m:o in the third image section 340, the image is not printed.

For example, a vertical distance ratio in the third image section 340 is 6:10, that is, 3:5, and a horizontal distance ratio in the third image section 340 is 4:4, that is, 1:1, the vertical distance ratio in the third image section 340 is identical to that of the copy prevention patterns 310 of FIG. 3A. Accordingly, the copy apparatus 100 determines the image to be money which has been reduced or enlarged in a single direction, so printing is prevented.

FIG. 3E illustrates patterns in a horizontally extended image and location ratios of the patterns. A fourth image section 350 in FIG. 3E includes patterns detected by the pattern detection unit 120.

The copy apparatus 100 calculates distances q, r, s, and t, diagonal distances q', r', s' and t', and angles $\theta_q$, $\theta_r$, $\theta_s$, and $\theta_t$ between patterns 1, 2, 3, 4, and 5 in the fourth image section 350.

The copy apparatus 100 may determine whether to print the image using at least one of a horizontal distance ratio or a vertical distance ratio between the patterns. For example, if a vertical distance ratio of b:d or a horizontal distance ratio of a:c in the copy prevention patterns 310 of FIG. 3A is identical to that of r:t or that of q:s in the third image section 340, the image is not printed.

For example, a vertical distance ratio in the fourth image section 350 is 3:5, and a horizontal distance ratio in the fourth image section 350 is 8:8, that is, 1:1, the vertical distance ratio in the fourth image section 350 is identical to that of the copy prevention patterns 310 of FIG. 3A. Accordingly, the copy apparatus 100 determines the image to be money which is reduced or enlarged in one direction, so printing is prevented.

Figure 3F:
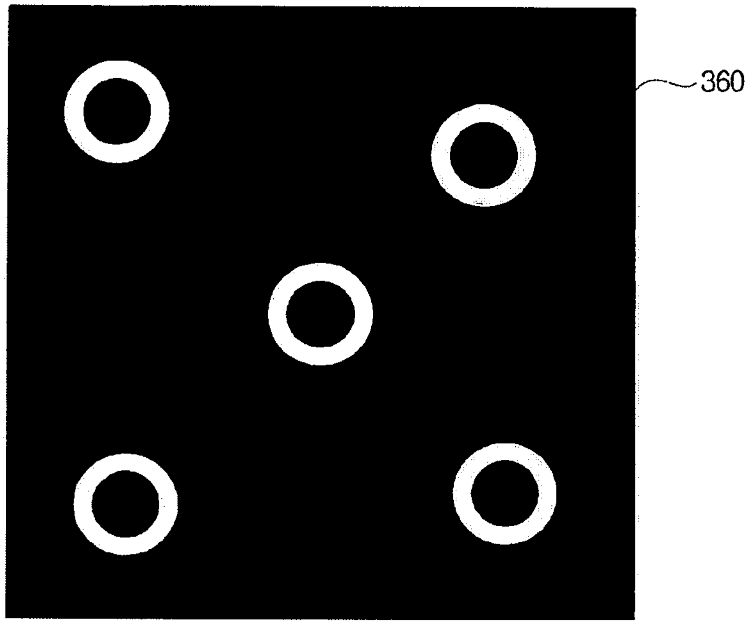

FIG. 3F illustrates an image section, for example, a brightness-reversed image section. The image section 360 in FIG. 3F may be an image section detected by the pattern detection unit 120. That is, patterns are detected by analyzing the relationships between adjacent pixels. In spite of a brightness-reversed image, the same pattern as that in FIG. 3B is detected by detecting the copy prevention patterns using shapes of patterns. Whether or not to print the image can be determined by calculating a location ratio of patterns in the same manner as described with reference to FIG. 3B, and comparing the location ratios with a ratio of pre-stored copy prevention patterns.

FIGS. 3A to 3F illustrate examples of applying figure patterns in a section of a paper money as copy prevention patterns, but these examples are merely exemplary embodiments, and picture patterns or letter patterns may also be used. Further, copy prevention patterns according to money regulations of each country may be applied. Distances and angles between the copy prevention patterns may be calculated using the center of each pattern.

Figure 4:
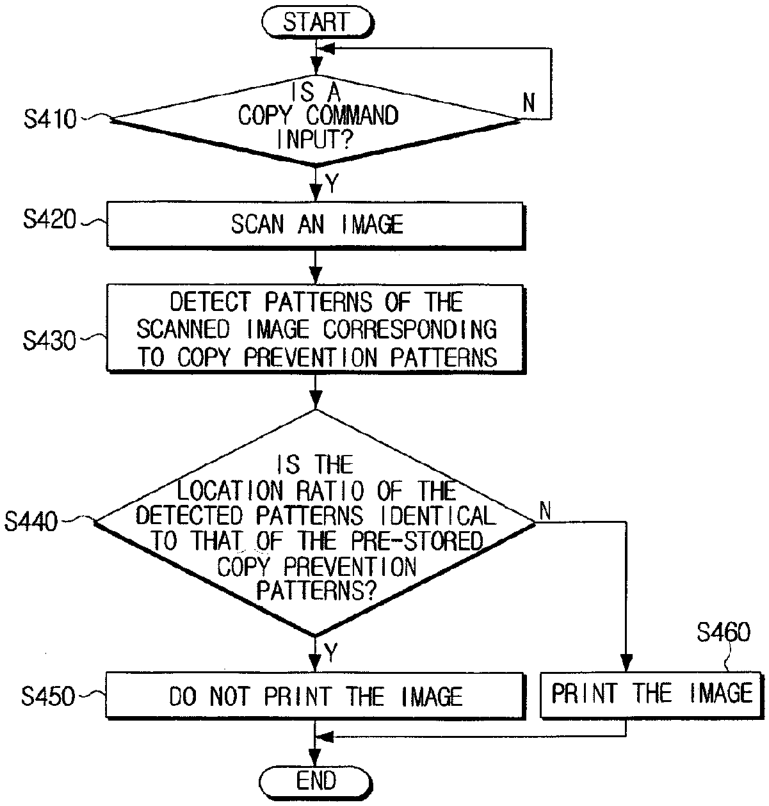
FIG. 4 is a flow chart illustrating a copy prevention method of a copy apparatus according to the embodiment of the present general inventive concept.

FIG. 4 is a flow chart illustrating a copy prevention method of a copy apparatus according to the embodiment of the present general inventive concept. Referring to FIGS. 1-4, the copy apparatus 100 receives a copy command in operation S410, and scans money on a document tray of the scanning unit 110 to generate a scanned image in operation S420.

The copy apparatus 100 detects patterns of the scanned image corresponding to copy prevention patterns in operation S430. The copy prevention patterns are patterns to prevent the money image from being printed, and may be picture patterns, figure patterns, or letter patterns, etc.

Next, if the location ratio of the detected patterns is identical to that of the pre-stored copy prevention patterns in operation S440, the copy apparatus 100 does not print the scanned image in operation S450. In addition, if the location ratio of the detected patterns is not identical to that of the pre-stored copy prevention patterns in operation S440, the copy apparatus 100 prints the scanned image in operation S460. As a result, if picture patterns, figure patterns, or letter patterns in an image are detected, printing operations can be prevented by determining that the scanned image is the money image. In addition, although the image is reduced or enlarged, copying is prevented if the patterns in the image have a location ratio identical to copy prevention patterns of genuine money.

Figure 5:
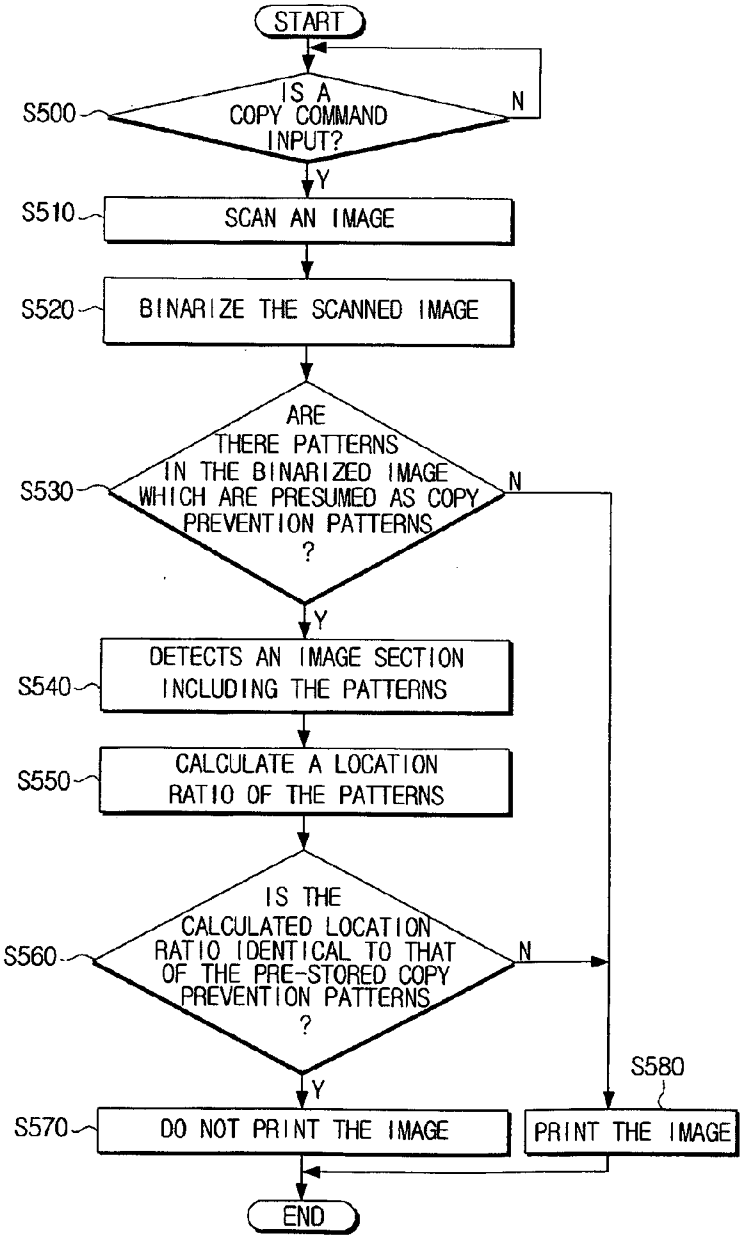
FIG. 5 is a flow chart illustrating the copy prevention method of the copy apparatus of FIG. 4.

FIG. 5 is a flow chart illustrating in more detail the copy prevention method of the copy apparatus of FIG. 4. With reference to FIG. 5, the copy apparatus 100 receives a copy command in operation S500, and scans an image on a document tray in operation S510.

Subsequently, the copy apparatus 100 binarizes the scanned image in operation S520.

The copy apparatus 100 determines whether there are patterns in the binarized image which are presumed to be copy prevention patterns in operation S530. In greater detail, the copy apparatus 100 detects patterns by identifying relationships between the pixels of the binarized image. Then, it is presumed whether the detected patterns are identical to pre-stored copy prevention patterns.

Subsequently, the copy apparatus 100 detects an image section including the patterns in operation S540. The copy apparatus 100 calculates the location ratio of the patterns in the image section in operation S550. More specifically, the copy apparatus 100 calculates the horizontal distance ratio, vertical distance ratio, entire distance ratio, diagonal ratio, and angle ratio using distances between the patterns.

The copy apparatus 100 determines if the calculated location ratio of the patterns is identical to that of the pre-stored copy prevention patterns in operation S560. If the location ratio of the patterns is identical to that of the pre-stored copy prevention patterns, printing operation is prevented in operation S570. In this case, the image is recognized as money so the image cannot be printed.

If there is no patterns in the scanned image which are presumed as copy prevention patterns in operation S530, or if the location ratio of the patterns in the image is not identical to that of the pre-stored copy prevention patterns in operation S560, the image is printed in operation S580. Therefore, although the size of money to be copied is reduced or enlarged, copying is prevented by comparing the location ratio of the detected patterns with that of copy prevention patterns.

As described above, the present general inventive concept provides that the location ratio of patterns in an image is detected and compared with the location ratio of copy prevention patterns which is a reference so that copying is prevented by identifying if the image is money. Consequently, although money which has been enlarged in size is copied at a smaller size or money which has been reduced in size is copied at a larger size, printing is not performed if the location ratio of the patterns in the image is identical to that of copy prevention patterns of genuine currency or money. Therefore, fake or counterfeit money is prevented by preventing a printing operation of printing a scanned image when the scanned image is a money image.

The present general inventive concept can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A copy apparatus comprising:

a scan unit to scan an image;

a pattern detection unit to detect patterns corresponding to pre-stored copy prevention patterns from among patterns in the scanned image; and a control unit to prevent the image from being printed if ratios of the detected patterns are identical to ratios of the copy prevention patterns, wherein the image is an enlarged size of money or a reduced size of money, and wherein the control unit calculates the ratios of the detected patterns by calculating a horizontal distance ratio, a vertical distance ratio, a diagonal distance ratio, an entire distance ratio, and a ratio of angles between the detected patterns, and determines if the calculated ratios are identical to the ratios of the copy prevention pattern.

2. The copy apparatus of claim 1, wherein the pattern detection unit comprises:

a binarization unit to binarize the scanned image; and a detection unit to detect an image section including the patterns presumed to be the copy prevention patterns from among the binarized image.

3. The copy apparatus of claim 1, wherein the control unit calculates the ratio of the detected patterns using distances between the detected patterns, and determines if the calculated ratio is identical to the ratio of the copy prevention pattern.

4. The copy apparatus of claim 1, wherein the pattern detection unit detects patterns using the shape of the patterns in the image if a brightness reverse copy signal is input.

5. A copy prevention method comprising:

scanning an image with a scan unit of a copy apparatus;

detecting patterns corresponding to pre-stored copy prevention patterns from among patterns in the scanned image with a pattern detection unit of the copy apparatus; and preventing the image from being printed if ratios of the detected patterns are identical to ratios of the copy prevention patterns with a control unit of the copy apparatus, wherein the image is an enlarged size of money or a reduced size of money, and wherein in preventing the image from being printed, the ratios of the detected patterns is calculated with the control unit by calculating a horizontal distance ratio, a vertical distance ratio, a diagonal distance ratio, an entire distance ratio, and a ratios of angles between the detected patterns, and it is determined with the control unit if the calculated ratios are identical to the ratios of the copy prevention pattern.

6. The copy prevention method of claim 5, wherein preventing the image from being printed comprises:

binarizing the scanned image with a binarization unit of the copy apparatus; and detecting an image section including the patterns presumed to be the copy prevention patterns from among the binarized image with a detection unit of the copy apparatus.

7. The copy prevention method of claim 5, wherein in preventing the image from being printed, the ratio of the detected patterns is calculated with the control unit using distances between the detected patterns, and it is determined with the control unit if the calculated ratio is identical to the ratio of the copy prevention pattern.

8. The copy prevention method of claim 5, wherein in preventing the image from being printed, patterns are detected with the control unit using the shape of the patterns in the image if a brightness reverse copy signal is input.

9. A copy apparatus comprising:

a scan unit which scans an image; and a pattern detection unit to detect patterns corresponding to a ratio of pre-stored copy prevention patterns from among patterns in the scanned image; and a control unit to prevent the image from being printed if the pattern detection unit detects a horizontal distance ratio, a vertical distance ratio, a diagonal distance ratio, an entire distance ratio, and a ratio of one or more angles between the patterns are identical to a horizontal distance ratio, a vertical distance ratio, a diagonal distance ratio, an entire distance ratio, and a ratio of angles between the pre-stored copy prevention patterns, wherein the image is an enlarged size of money or a reduced size of money.

10. A copy apparatus comprising:

a scan unit which scans an image; and a control unit to prevent the image from being printed if a horizontal distance ratio, a vertical distance ratio, a diagonal distance ratio, an entire distance ratio, and a ratio of angles between patterns of the scanned image are identical to a horizontal distance ratio, a vertical distance ratio, a diagonal distance ratio, an entire distance ratio, and a ratio of angles between pre-stored copy prevention patterns are included in the scanned image, wherein the image is an enlarged size of money or a reduced size of money.

11. The copy apparatus of claim 10, wherein the control unit detects the patterns corresponding to the ratio of the copy prevention patterns using the shape of the patterns in the image if a brightness reverse copy signal is input, so that the image is not printed.

12. A copy apparatus comprising:

a pattern detection unit to detect patterns corresponding to pre-stored copy prevention patterns from among patterns of a scanned image; and a control unit to prevent the image from being printed if a horizontal distance ratio, a vertical distance ratio, a diagonal distance ratio, an entire distance ratio, and a ratio of angles between the detected patterns is identical to a horizontal distance ratio, a vertical distance ratio, a diagonal distance ratio, an entire distance ratio, and a ratio of angles between the copy prevention patterns, wherein the image is an enlarged size of money or a reduced size of money.

13. The copy apparatus of claim 12, further comprising:

a scan unit to scan an image to generate the scanned image.

14. The copy apparatus of claim 13, wherein the scan unit is connected to the pattern detection unit through a wire network or a wireless network.

15. The copy apparatus of claim 12, further comprising:

a scan unit to scan a first image and reduces or enlarges the first image to generate a second image as the scanned image.

16. The copy apparatus of claim 12, further comprising:

a print unit to print the scanned image, wherein the control unit does not transmit the scanned image to the print unit to prevent the scanned image from being printed.

17. The copy apparatus of claim 12, further comprising:

a storage unit to store the scanned image, wherein the control unit controls the storage unit not to store the scanned image.

18. The copy apparatus of claim 12, further comprising:

an external device connected to the control unit to exchange or receive data with or from the control unit, wherein the control unit does not transmit the scanned image to the external device.

19. The copy apparatus of claim 12, wherein:

the patterns comprise a first group of patterns having a first characteristic, and a second group of patterns having a second characteristic;

the pre-stored copy prevention patterns comprise a third group of patterns having a third characteristic, and a fourth group of patterns having a fourth characteristic;

the ratio of the patterns comprises a ratio of the first characteristic and the second characteristic; and the ratio of the copy prevention patterns comprises a ratio of the third characteristic and the fourth characteristic.

20. The copy apparatus of claim 12, wherein:

the patterns comprise a first group of patterns spaced-apart from each other by a first distance, and a second group of patterns spaced-apart from each other by a second distance;

the pre-stored copy prevention patterns comprise a third group of patterns spaced-apart from each other by a third distance, and a fourth group of patterns spaced-apart from each other by a fourth distance;

the ratio of the patterns comprises a ratio of the first distance and the second distance; and the ratio of the copy prevention patterns comprises a ratio of the third distance and the fourth distance.

21. The copy apparatus of claim 20, wherein the first distance, the second distance, the third distance, and the fourth distance are disposed in a same direction.

22. The copy apparatus of claim 12, wherein the patterns comprises a combination of one or more of a picture pattern, a figure pattern, a numerical digit pattern, a letter patterns, and a watermark pattern.

* * * * *